(12) United States Patent
Ishikawa et al.

(10) Patent No.: US 10,895,301 B2
(45) Date of Patent: Jan. 19, 2021

(54) FLUID-FILLED VIBRATION-DAMPING DEVICE

(71) Applicant: SUMITOMO RIKO COMPANY LIMITED, Komaki (JP)

(72) Inventors: Ryota Ishikawa, Komaki (JP); Takayoshi Yasuda, Komaki (JP); Syuya Sonobe, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 54 days.

(21) Appl. No.: 16/251,292

(22) Filed: Jan. 18, 2019

(65) Prior Publication Data

US 2019/0154105 A1     May 23, 2019

Related U.S. Application Data

(63) Continuation of application No. PCT/JP2018/008509, filed on Mar. 6, 2018.

(30) Foreign Application Priority Data

Mar. 17, 2017    (JP) .............................. 2017-052927

(51) Int. Cl.
     *F16F 13/10*        (2006.01)
(52) U.S. Cl.
     CPC .......... *F16F 13/106* (2013.01); *F16F 13/102* (2013.01); *F16F 13/107* (2013.01)
(58) Field of Classification Search
     CPC ........ F16F 13/10; F16F 13/105; F16F 13/106; F16F 13/107; F16F 13/102

(Continued)

(56) References Cited

U.S. PATENT DOCUMENTS 4,182,438 A * 1/1980 Pepi .......................... F16F 9/34
                                                   188/322.14
4,356,898 A * 11/1982 Guzder ................. F16F 9/3482
                                                    188/280

(Continued)

FOREIGN PATENT DOCUMENTS

JP      2011-241926 A     12/2011
JP       4861843 B2      1/2012

(Continued)

OTHER PUBLICATIONS

Apr. 24, 2018 International Search Report issued in International Patent Application No. PCT/JP2018/008509.

(Continued)

*Primary Examiner* — Thomas J Williams
(74) *Attorney, Agent, or Firm* — Oliff PLC

(57) ABSTRACT

A fluid-filled vibration-damping device including: a pressure-receiving chamber with a non-compressible fluid filled therein; an equilibrium chamber with the non-compressible fluid filled therein; an orifice passage connecting the pressure-receiving chamber and the equilibrium chamber with each other; a relief configured to open a short-circuit passage by an action of a negative pressure occurring in the pressure-receiving chamber upon input of an impact load so as to connect the pressure-receiving chamber with the equilibrium chamber so that cavitation is suppressed; and at least one leak passage provided at a part of the short-circuit passage in the relief, the at least one leak passage keeping a communication state between the pressure-receiving chamber and the equilibrium chamber with a smaller passage cross section than that of the orifice passage, even when the short-circuit passage is not opened.

6 Claims, 10 Drawing Sheets

(58) Field of Classification Search
USPC .......................... 267/140.13, 140.14, 140.15
See application file for complete search history.

(56) References Cited

U.S. PATENT DOCUMENTS

| | | | | |
|---|---|---|---|---|
| 4,697,793 A * | 10/1987 | Reuter | ................. | F16F 13/105 267/140.13 |
| 4,932,636 A * | 6/1990 | Phillips | ................. | F16F 13/105 267/140.13 |
| 5,029,824 A * | 7/1991 | LaBeau | ................. | F16F 13/106 267/140.13 |
| 8,424,854 B2 * | 4/2013 | Ichikawa | ............... | F16F 13/105 267/140.13 |
| 8,651,467 B2 | 2/2014 | Ishikawa et al. | | |
| 2007/0085249 A1 * | 4/2007 | Happou | ............... | F16F 13/262 267/140.13 |
| 2015/0069686 A1 * | 3/2015 | Okumura | ............... | F16F 13/08 267/140.13 |

FOREIGN PATENT DOCUMENTS

| | | |
|---|---|---|
| JP | 5542565 B2 | 7/2014 |
| JP | 2015-102168 A | 6/2015 |
| JP | 2016-138614 A | 8/2016 |

OTHER PUBLICATIONS

Sep. 17, 2019 International Preliminary Report on Patentability issued in International Patent Application No. PCT/JP2018/008509.
Mar. 17, 2020 Office Action issued in Chinese Patent Application No. 201880003809.6.

\* cited by examiner

FLUID-FILLED VIBRATION-DAMPING DEVICE

INCORPORATED BY REFERENCE

This application is a Continuation of International Application No. PCT/JP2018/008509 filed Mar. 6, 2018, which claims priority under 35 U.S.C. §§ 119(a) and 365 of Japanese Patent Application No. 2017-052927 filed on Mar. 17, 2017, the disclosures of which are expressly incorporated herein by reference in their entireties.

BACKGROUND OF THE INVENTION

1. Field of the Invention

The present invention relates to a vibration-damping device applied to an engine mount of an automobile, etc., and more particularly to a fluid-filled vibration-damping device utilizing a vibration-damping effect or the like based on a flow action of a non-compressible fluid filled therein.

2. Description of the Related Art

As one kind of vibration-damping device applied to an engine mount of an automobile or the like, there has been known such a fluid-filled vibration-damping device as disclosed in Japanese Unexamined Patent Publication No. JP-A-2015-102168 and the like. In the fluid-filled vibration-damping device of JP-A-2015-102168, a pressure-receiving chamber and an equilibrium chamber having a non-compressible fluid filled therein are provided, and an orifice passage is provided connecting the pressure-receiving chamber and the equilibrium chamber with each other.

In JP-A-2015-102168, a relief means is provided suppressing cavitation by connecting the pressure-receiving chamber and the equilibrium chamber with each other through a short-circuit passage, when a negative pressure is generated in the pressure-receiving chamber by input of an impact load. The relief means is provided with a relief valve for switching the short-circuit passage between communication and obstruction. The short-circuit passage can be switched to the communication state by deformation or displacement of the relief valve by the action of the negative pressure of the pressure-receiving chamber.

In JP-A-2015-102168, upon input of a vibration with a higher frequency than the tuning frequency of the orifice passage, the orifice passage is substantially obstructed by antiresonance. This may cause higher dynamic spring to decrease the vibration-damping performance. In order to prevent deterioration of the vibration-damping performance, a structure provided with a switching path tuned to a higher frequency than that of the orifice passage is disclosed in JP-A-2015-102168. Thus, also when the orifice passage is substantially obstructed, the pressure-receiving chamber and the equilibrium chamber are in communication with each other through the switching path. This moderates the higher dynamic spring due to the substantial sealing of the pressure-receiving chamber, so that the vibration-damping performance improves owing to lower dynamic spring.

However, according to the structure of JP-A-2015-102168, there are required a space for forming the switching path and a switch valve for switching the switching path between communication and obstruction. Therefore, it is desirable to realize the target excellent vibration-damping performance, with a structure that is simpler and more compact. Further, in the structure of JP-A-2015-102168, upon the input of the vibration with the frequency to which the orifice passage is tuned, the switch valve undergoes elastic deformation, thus obstructing the switching path. However, in such a switching mechanism, the obstruction of the switching path is slightly later than the input. Thus, there is a possibility that further improvement and stabilization of the vibration-damping performance, and the like can be realized by more quickly switching the switching path between the communication and obstruction.

SUMMARY OF THE INVENTION

It is therefore one object of the present invention to provide a fluid-filled vibration-damping device of novel structure which is able to realize more excellent vibration-damping performance by a simple and compact structure.

The above and/or optional objects of this invention may be attained according to at least one of the following preferred embodiments of the invention. The following preferred embodiments and/or elements employed in each preferred embodiment of the invention may be adopted at any possible optional combinations.

Specifically, a first preferred embodiment of the present invention provides a fluid-filled vibration-damping device comprising: a pressure-receiving chamber with a non-compressible fluid filled therein; an equilibrium chamber with the non-compressible fluid filled therein; an orifice passage connecting the pressure-receiving chamber and the equilibrium chamber with each other; a relief configured to open a short-circuit passage by an action of a negative pressure occurring in the pressure-receiving chamber upon input of an impact load so as to connect the pressure-receiving chamber with the equilibrium chamber so that cavitation is suppressed; and at least one leak passage provided at a part of the short-circuit passage in the relief, the at least one leak passage keeping a communication state between the pressure-receiving chamber and the equilibrium chamber with a smaller passage cross section than that of the orifice passage, even when the short-circuit passage is not opened.

According to this fluid-filled vibration-damping device structured following the first preferred embodiment, even when the orifice passage is substantially obstructed, the pressure-receiving chamber and the equilibrium chamber are kept in a communication state through the leak passage. As a result, the vibration-damping effect owing to lower dynamic spring can be effectively obtained. In addition, the leak passage has a smaller passage cross sectional area than that of the orifice passage. Consequently, a fluid flow through the orifice passage occurs in a more positive manner than a fluid flow through the leak passage, upon the vibration input with the frequency to which the orifice passage is tuned. Thus, the vibration-damping effect based on the flow action of the fluid is effectively exerted.

Furthermore, since the leak passage is provided in the part of the short-circuit passage of the relief, it is possible to realize a fluid-filled vibration-damping device having both the relief and the leak passage in a compact manner, and it is also possible to simplify the structure and the like.

A second preferred embodiment of the present invention provides the fluid-filled vibration-damping device according to the first preferred embodiment, further comprising: a partition disposed dividing the pressure-receiving chamber and the equilibrium chamber so that the short-circuit passage is formed in the partition; and a valve body obstructing the short-circuit passage by elastic pressing abutment thereof against the partition, wherein the relief is provided such that the pressing abutment of the valve body against the partition is cancelled by the action of the negative pressure occurring in the pressure-receiving chamber upon the input of the impact load so that the short-circuit passage is opened to connect the pressure-receiving chamber with the equilibrium chamber and the cavitation is suppressed, and the leak passage is formed in a groove shape opening in a face in the partition against which the valve body is pressed.

According to the second preferred embodiment, the leak passage is formed in the groove shape opening in the face in the partition against which the valve body of the relief is pressed. This makes it possible to form the leak passage that keeps the pressure-receiving chamber and the equilibrium chamber in the communication state irrespective of opening and closing of the valve body, with a simple structure. Also, a compact structure can be realized, without requiring a special space to form the leak passage.

A third preferred embodiment of the present invention provides the fluid-filled vibration-damping device according to the second preferred embodiment, further comprising: an urger urging the valve body disposed on the short-circuit passage, from a side of the pressure-receiving chamber to a side of the equilibrium chamber, and elastically pressing the valve body against the partition so that the short-circuit passage is obstructed by the valve body, wherein the leak passage is formed in a groove shape extending radially outward from an opening of the short-circuit passage beyond the valve body, in the face in the partition against which the valve body is pressed.

According to the third preferred embodiment, the valve body is urged by the urger and pressed against the partition, whereby the short-circuit passage is obstructed by the valve body. Meanwhile, by the action of the negative pressure occurring in the pressure-receiving chamber, the valve body is moved toward the side of the pressure-receiving chamber, against the urging force of the urger. This movement cancels obstruction of the short-circuit passage by the valve body, whereby the short-circuit passage is switched to the communication state. In this relief structured as described above, the leak passage is provided with a simple structure and excellent space efficiency.

A fourth preferred embodiment of the present invention provides the fluid-filled vibration-damping device according to the third preferred embodiment, further comprising: a housing space formed in the partition, the housing space housing the valve body and the urger; and a holding protrusion formed in an inner face of the housing space, the holding protrusion protruding inward, wherein an outer face of the valve body and a protruding distal end of the holding protrusion are abutted so that the valve body is positioned within the housing space, and the leak passage is formed in a part separate from the holding protrusion in a peripheral direction, in the inner face of the housing space.

According to the fourth preferred embodiment, the valve body in the housing space is positioned by the holding protrusion in a direction substantially orthogonal to the urging direction by the urger. The leak passage is provided at a part separate from the holding protrusion in the peripheral direction. As a result, the outer peripheral end portion of the leak passage is stably opened on the outer peripheral side of the valve body, without being covered by the valve body. Therefore, the communication state between the pressure-receiving chamber and the equilibrium chamber is stably kept by the leak passage.

A fifth preferred embodiment of the present invention provides the fluid-filled vibration-damping device according to the third or fourth preferred embodiment, wherein the at least one leak passage comprises a plurality of leak passages formed in a spoke-wise fashion radially outward from the opening of the short-circuit passage.

According to the fifth preferred embodiment, by adjusting the number of leak passages, it is possible to make the passage cross sectional area of each leak passage smaller than that of the orifice passage. This makes it possible to effectively obtain the vibration-damping effect by the orifice passage, while adjusting the spring characteristics in a state in which the orifice passage is substantially obstructed.

A sixth preferred embodiment of the present invention provides the fluid-filled vibration-damping device according to the second preferred embodiment, wherein the valve body formed of an elastic body is pressed against a passage inner face of the short-circuit passage so that the short-circuit passage is obstructed by the valve body, and the leak passage is formed in a groove shape extending outward beyond a part against which the valve body is pressed, in a length direction of the short-circuit passage, in the passage inner face of the short-circuit passage.

According to the sixth preferred embodiment, the valve body is pressed against the passage inner face of the short-circuit passage based on the elasticity of the valve body in itself, so that the short-circuit passage is obstructed by the valve body. On the other hand, by the action of the negative pressure occurring in the pressure-receiving chamber, the valve body undergoes elastic deformation to separate from the passage inner face of the short-circuit passage. This cancels the obstruction of the short-circuit passage by the valve body, so that the short-circuit passage is switched to the communication state. In the relief of this structure, the leak passage can be provided with a simple structure and excellent space efficiency.

A seventh preferred embodiment of the present invention provides the fluid-filled vibration-damping device according to any one of the first to sixth preferred embodiments, wherein a passage cross sectional area of the leak passage is not larger than half as large as a passage cross sectional area of the orifice passage, and a resonance frequency of the fluid flowing through the leak passage is set to be a higher frequency than a resonance frequency of the fluid flowing through the orifice passage.

According to the seventh preferred embodiment, the passage cross sectional area of the leak passage is made sufficiently smaller than the passage cross sectional area of the orifice passage. Consequently, upon input of a vibration with the frequency to which the orifice passage is tuned, the fluid flow through the orifice passage is more dominantly generated, whereby the vibration-damping effect based on the flow action of the fluid is effectively exerted.

Further, for a vibration input with a higher frequency than the resonance frequency of the fluid flowing through the orifice passage (the tuning frequency), the communication state between the pressure-receiving chamber and the equilibrium chamber is maintained by the leak passage tuned to a higher frequency than that of the orifice passage. As a result, it is possible to prevent higher dynamic spring due to antiresonance of the orifice passage and effectively obtain the vibration-damping effect by low dynamic spring characteristics.

According to the present invention, in the fluid-filled vibration-damping device provided with the relief, the leak passage for maintaining the communication state between the pressure-receiving chamber and the equilibrium chamber is provided in the part of the short-circuit passage in the relief. Thus, the pressure-receiving chamber and the equilibrium chamber are maintained in a communication state through the leak passage, even in a state in which the orifice passage is substantially obstructed. Therefore, it is possible to effectively obtain the vibration-damping effect owing to lower dynamic spring. Furthermore, since the leak passage is provided in the part of the short-circuit passage in the relief, it is possible to compactly realize the fluid-filled vibration-damping device having both the relief and the leak passage, and to simplify the structure, and the like. In addition, the passage cross sectional area of the leak passage is made smaller than that of the orifice passage. Therefore, upon a vibration input with the frequency to which the orifice passage is tuned, the fluid flow through the orifice passage is generated in a more positive manner than the fluid flow through the leak passage, thereby effectively exerting the vibration-damping effect based on the flow action of the fluid.

BRIEF DESCRIPTION OF THE DRAWINGS

The foregoing and/or other objects, features and advantages of the invention will become more apparent from the following description of practical embodiments with reference to the accompanying drawings in which like reference numerals designate like elements and wherein.

DETAILED DESCRIPTION OF EMBODIMENTS

Hereinafter, practical embodiments of the present invention will be described with reference to the drawings.

Figure 1:
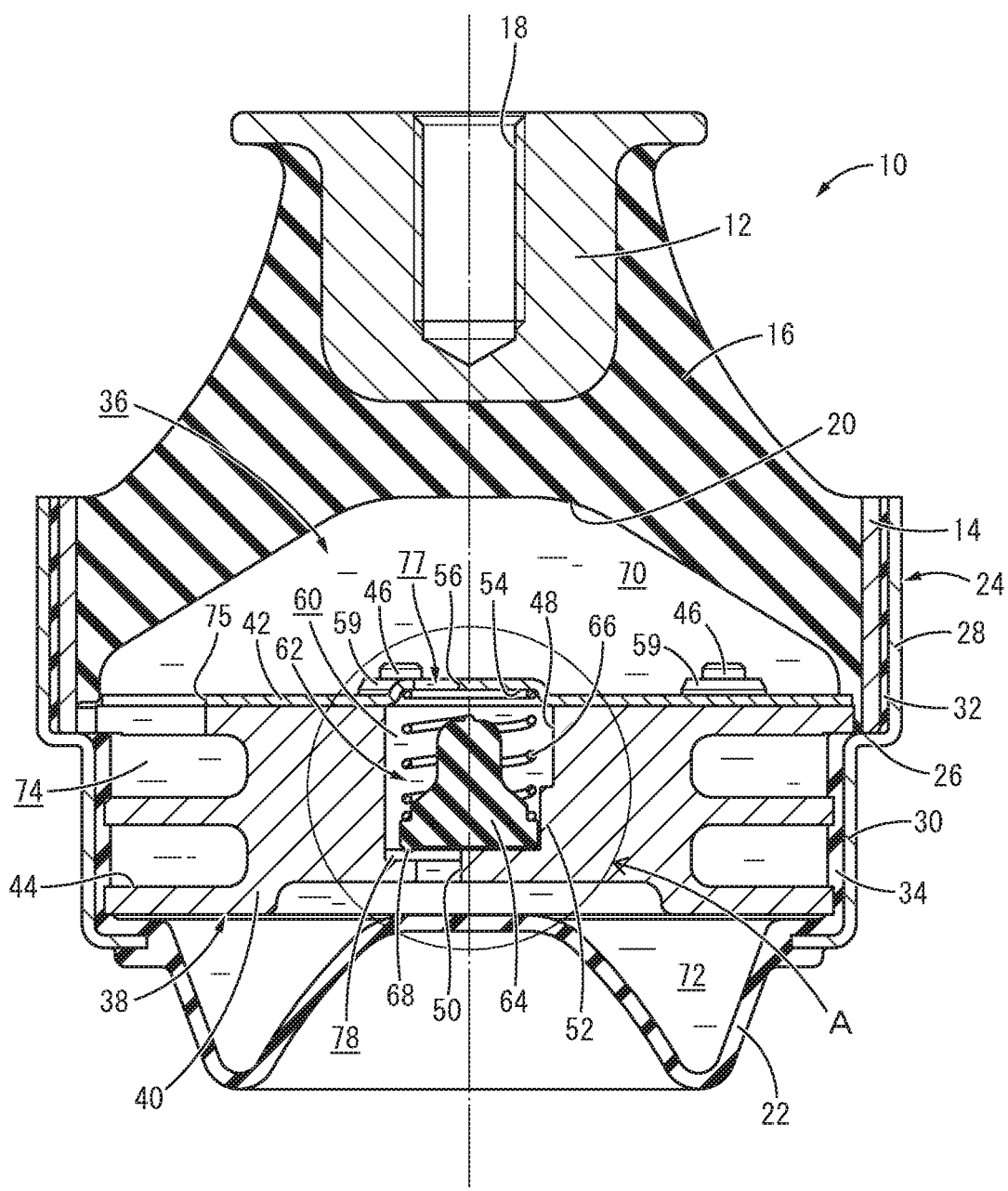
FIG. 1 is a cross-sectional view showing a fluid-filled vibration-damping device in the form of an engine mount as a first practical embodiment of the present invention.

FIG. 1 shows an automotive engine mount 10 serving as a first practical embodiment of a fluid-filled vibration-damping device having a structure according to the present invention. The engine mount 10 has a structure in which a first attachment member 12 and a second attachment member 14 are elastically connected to each other by a main rubber elastic body 16. In the following description, as a general rule, the up-down direction means the up-down direction in FIG. 1, which is the direction of the mount central axis.

More specifically, the first attachment member 12 is a high rigidity member made of metal or synthetic resin and it has a substantially cylindrical shape as a whole. The first attachment member 12 includes a screw hole 18 that extends vertically on the central axis, opening in the upper face thereof.

As shown in FIG. 1, the second attachment member 14 is a member having high rigidity like the first attachment member 12, and it has a substantially cylindrical shape with a thin wall and a large diameter. The second attachment member 14 is disposed coaxially with the first attachment member 12, on the lower side of it, and the first attachment member 12 and the second attachment member 14 are elastically connected to each other by the main rubber elastic body 16.

The main rubber elastic body 16 has a shape of substantially truncated cone as a whole. The first attachment member 12 is fixed to the end on the small diameter side, while the second attachment member 14 is fixed to the end on the large diameter side. The main rubber elastic body 16 of the present practical embodiment takes the form of an integrally vulcanization molded component incorporating the first attachment member 12 and the second attachment member 14. Besides, the main rubber elastic body 16 includes a recess 20 having an inverted bowl shape and opening in the lower face thereof.

A flexible membrane 22 is attached to the second attachment member 14. The flexible membrane 22 is a rubber film having a thin generally circular dome shape, which is easily deformable, with a slack in the up-down direction. A fitting tube member 24 is fixed to the outer peripheral end portion of the flexible membrane 22. The fitting tube member 24 has a nearly cylindrical shape, and a step 26 is formed in a middle portion of the fitting tube member 24 in the up-down direction. The upper side of the step 26 is a large-diameter tubular portion 28, while the lower side thereof is a small-diameter tubular portion 30. An outer peripheral end portion of the flexible membrane 22 is bonded by vulcanization to a lower end portion of the fitting tube member 24 projecting radially inward. The lower opening of the fitting tube member 24 is fluid-tightly closed by the flexible membrane 22.

When the large-diameter tubular portion 28 of the fitting tube member 24 is externally disposed about the second attachment member 14, the fitting tube member 24 is subjected to a diameter reduction process such as 360-degree radial compression. By so doing, the fitting tube member 24 is fitted to the second attachment member 14, in the large-diameter tubular portion 28. As a result, the flexible membrane 22 fixed to the fitting tube member 24 is attached to the second attachment member 14, so that the lower opening of the second attachment member 14 is closed by the flexible membrane 22. A first seal rubber layer 32 is fixed to the large-diameter tubular portion 28 of the fitting tube member 24 so as to cover substantially the entire radially inner face thereof. The second attachment member 14 and the large-diameter tubular portion 28 are fitted to each other via the first seal rubber layer 32, thereby fluid-tightly sealing the space between the second attachment member 14 and the large-diameter tubular portion 28. Further, a second seal rubber layer 34 formed integrally with the flexible membrane 22 is fixed to the small-diameter tubular portion 30 of the fitting tube member 24 so as to cover substantially the entire radially inner face thereof.

When this flexible membrane 22 is attached to the second attachment member 14, a fluid chamber 36 is formed between the main rubber elastic body 16 and the flexible membrane 22, fluid-tightly isolated from the outside, with the non-compressible fluid sealed therein. The non-compressible fluid filled in the fluid chamber 36 is not particularly limited, but a liquid such as water, ethylene glycol, alkylene glycol, polyalkylene glycol, silicone oil, or a mixture liquid of some of them is preferably adopted. Further, in order to efficiently obtain the vibration-damping effect based on the flow action of the fluid described later, it is desirable to use a liquid with low viscosity of 0.1 Pa·s or lower, as the non-compressible fluid sealed in the fluid chamber 36.

Figure 2:
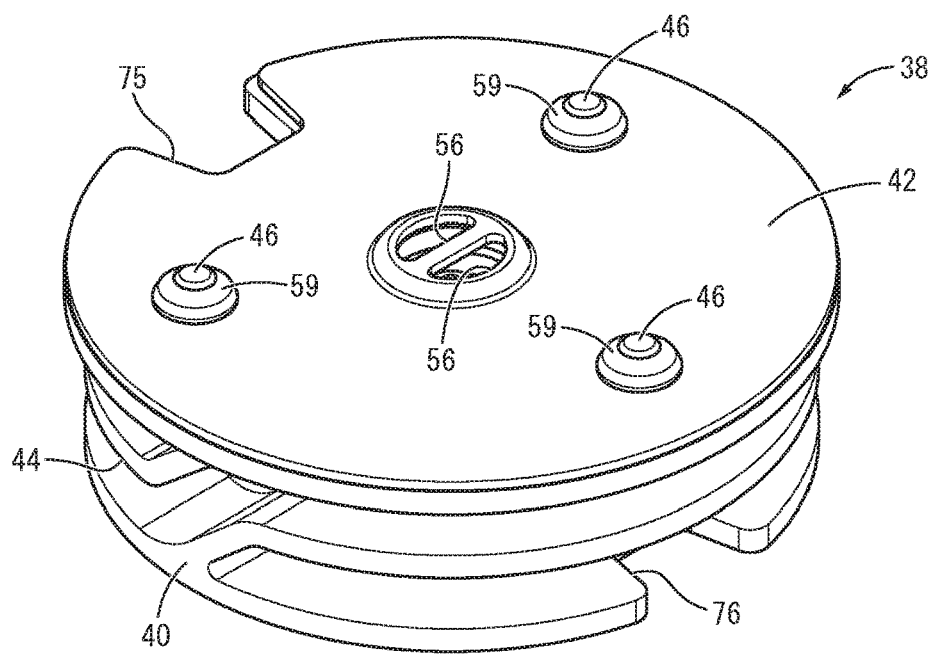
FIG. 2 is a perspective view of a partition constituting the engine mount shown in FIG. 1.
Figure 3:
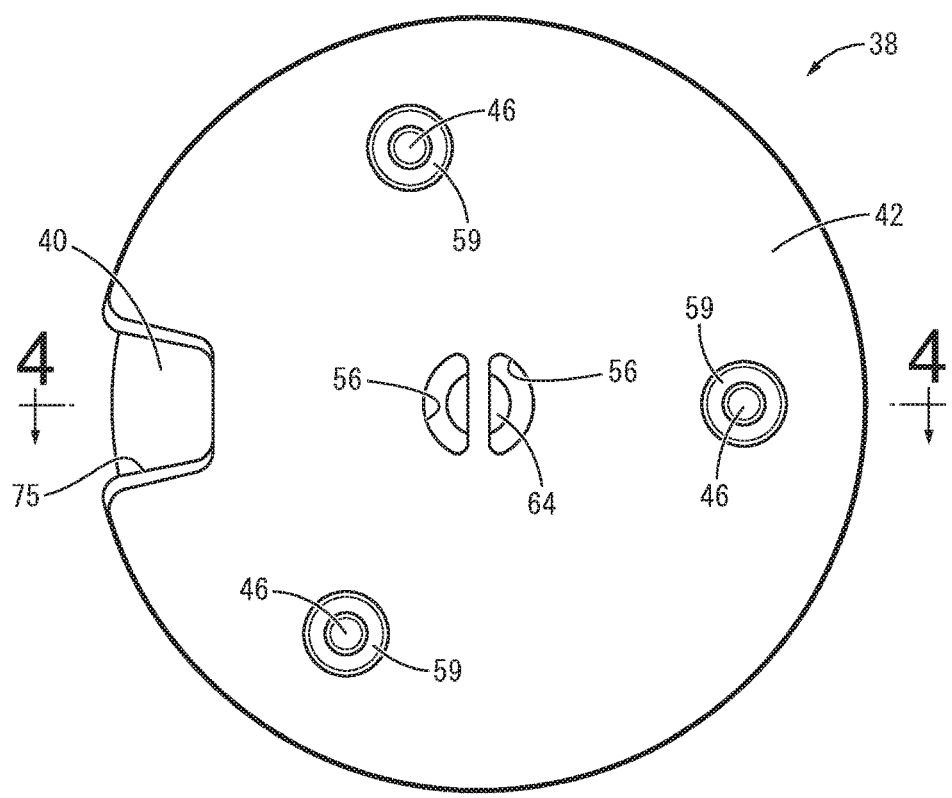
FIG. 3 is a plan view of the partition shown in FIG. 2.
Figure 4:
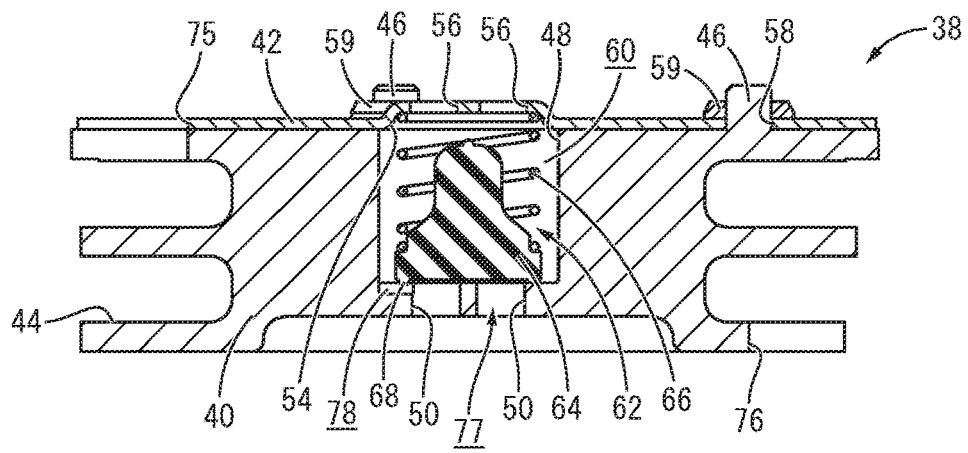
FIG. 4 is a cross-sectional view taken along line 4-4 of FIG. 3.

In the fluid chamber 36, a partition 38 is disposed. As shown in FIGS. 2 to 4, the partition 38 has a substantially disk shape as a whole, and a structure in which a lid plate member 42 is superposed on the upper face of a partition main body 40.

Figure 5:
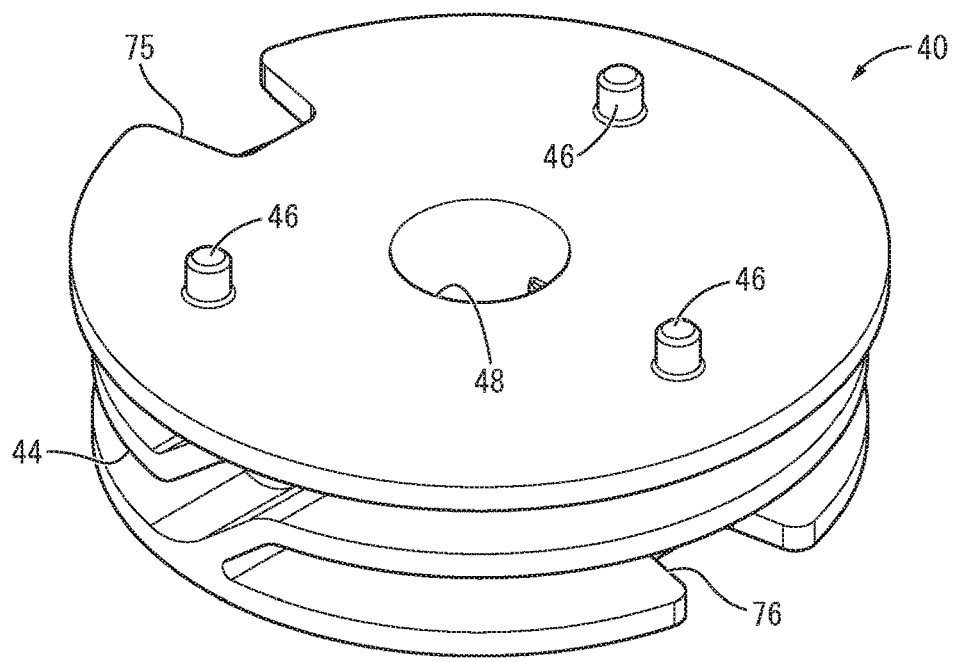
FIG. 5 is a perspective view of a partition main body constituting the partition shown in FIG. 2.
Figure 6:
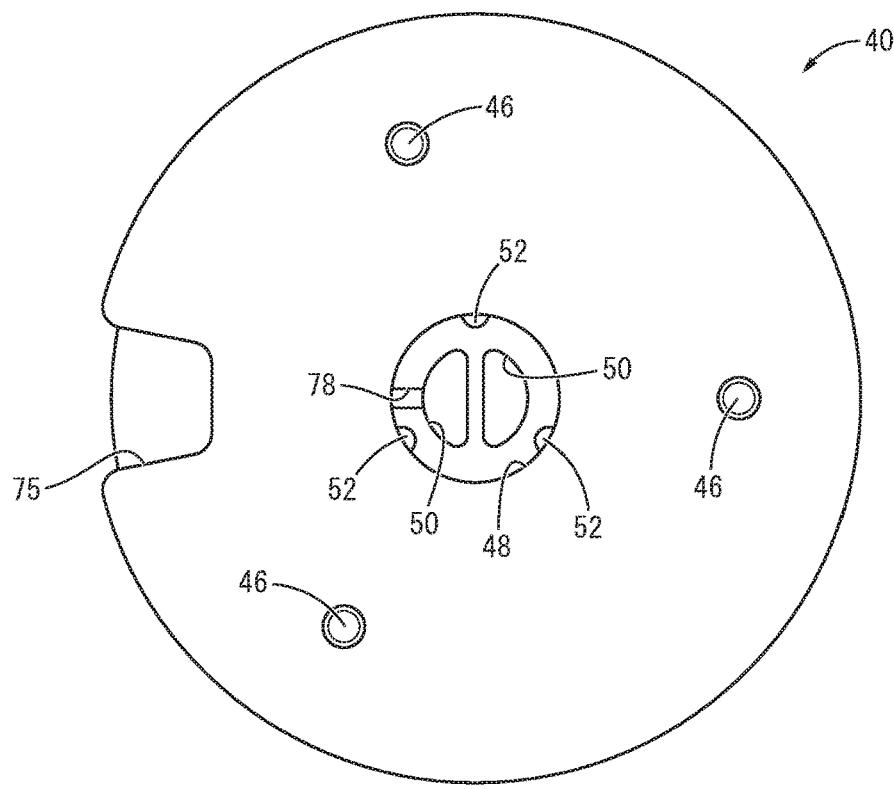
FIG. 6 is a plan view of the partition main body shown in FIG. 5.

The partition main body 40 is a hard member made of metal or synthetic resin, and it has a thick nearly disk shape as shown in FIGS. 5 and 6. Moreover, a peripheral groove 44 is formed in the outer peripheral end portion of the partition main body 40 so as to extend in a spiral shape with a length of less than two circumferences in the circumferential direction while opening to the outer peripheral face. Furthermore, a plurality of fitting pins 46, each having a small-diameter substantially cylindrical shape, are formed projecting at the upper face in the radially intermediate portion of the partition main body 40.

In the center portion of the partition main body 40 in diametrical directions, a housing recess 48 is formed with a substantially circular cross section, opening in the upper face thereof. In the housing recess 48, two lower short-circuit holes 50, 50 are formed vertically penetrating the bottom wall portion, and a plurality of holding protrusions 52 are formed to protrude on the inner face of the peripheral wall. The holding protrusion 52 protrudes inward and extends continuously from the vertical center to the lower end of the housing recess 48. The radially inner ends of the plurality of holding protrusions 52 are positioned on substantially the same circumference, and the diameter of the circumference is substantially the same as or slightly larger than the outer diameter of the lower portion of a valve body 64, which will be described later.

In the present practical embodiment, three holding protrusions 52, 52, 52 are arranged at substantially equal intervals in the circumferential direction, but the number and arrangement of the holding protrusions 52 can be changed as appropriate. The specific shape of the holding protrusion 52 is not particularly limited, either. However, it is preferable that the holding protrusion 52 extends continuously in the up-down direction so that the valve body 64 can be positioned in the axis-perpendicular direction even when the valve body 64 described later is displaced vertically. Further, the protruding distal end face of the holding protrusion 52 in contact with the valve body 64 is preferably formed as a curved face that is convex to the radial inside of the housing recess 48, which is the protruding distal end side. With this curved face, the holding protrusion 52 is less likely to damage the valve body 64 when contacting the valve body 64, and the friction resistance acting between the holding protrusion 52 and the valve body 64 is small.

The lid plate member 42 is a thin-walled member having a substantially disk shape corresponding to the partition main body 40. In this practical embodiment, the lid plate member 42 is provided with a positioning concave part 54 whose diametrically central portion is concave to the lower side, with two upper short-circuit holes 56, 56 formed through the upper base wall portion of the positioning concave part 54. A plurality of pin insertion holes 58 penetrating vertically are formed in the radially intermediate portion of the lid plate member 42. Each of the pin insertion holes 58 has a circular cross section corresponding to the fitting pin 46 of the partition main body 40.

The lid plate member 42 is superposed on the upper face of the partition main body 40. The fitting pin 46 of the partition main body 40 is inserted through the pin insertion hole 58 of the lid plate member 42, and an annular fitting ring 59 is fitted to the distal end portion of the fitting pin 46, which is inserted through the pin insertion hole 58. Thus, the partition main body 40 and the lid plate member 42 are fixed to each other, and the upper part of the partition main body 40 is covered by the lid plate member 42. The fixation means for fixing the partition main body 40 and the lid plate member 42 is not limited. For example, it is possible to mutually fix the partition main body 40 and the lid plate member 42, by expanding the diameter of the distal end portion of the fitting pin 46 inserted through the pin insertion hole 58 by crushing it or the like, and thus engaging the fitting pin 46 in the opening peripheral end of the pin insertion hole 58 of the lid plate member 42.

The upper opening of the housing recess 48 formed in the partition main body 40 is covered by the lid plate member 42, so that a housing space 60 is defined by the partition main body 40 and the lid plate member 42. In this housing space 60, a relief mechanism 62 is provided. The relief mechanism 62 of this practical embodiment is constituted including the valve body 64 and a coil spring 66 serving as an urger.

The valve body 64 is formed of a rubber elastic body and it has a substantially circular block shape as a whole. The lower portion of the valve body 64 has a larger diameter than the upper portion thereof, and an annular seal lip 68 is formed integrally at the outer peripheral end portion of the lower face of the valve body 64 so as to project downward. The upper end portion of the coil spring 66 is inserted into the positioning concave part 54 of the lid plate member 42, while the lower end portion of the coil spring 66 is externally disposed about and attached to the valve body 64. The coil spring 66 is compressed vertically between the lid plate member 42 and the lower portion of the valve body 64. As a result, the valve body 64 is urged downward based on the elasticity of the coil spring 66, and the seal lip 68 of the valve body 64 is elastically pressed against the bottom wall inner face of the housing space 60.

The valve body 64 is arranged radially inside the plurality of holding protrusions 52, whereby the valve body 64 is positioned substantially in the center in the axis-perpendicular direction within the housing space 60 by abutment against the holding protrusions 52. The seal lip 68 of the valve body 64 is disposed on the outer peripheral side of the two lower short-circuit holes 50, 50. The seal lip 68 is pressed against the bottom wall inner face of the housing space 60, in a position surrounding the outer peripheral side of the lower short-circuit holes 50, 50. Consequently, in a stationary state of the engine mount 10 in the absence of vibration input, the lower short-circuit holes 50, 50 are substantially blocked by the valve body 64.

As shown in FIG. 1, the partition 38 having such a structure is inserted into the small-diameter tubular portion 30 of the fitting tube member 24 and disposed between the main rubber elastic body 16 and the flexible membrane 22.

In the present practical embodiment, the small-diameter tubular portion 30 of the fitting tube member 24 is subjected to a diameter reduction process, so that the partition 38 is attached to the fitting tube member 24. The upper end portion of the partition 38 is inserted in the second attachment member 14 and it is pressed against the lower face of the outer peripheral end portion of the main rubber elastic body 16. The second seal rubber layer 34 is disposed between the small-diameter tubular portion 30 of the fitting tube member 24 and the partition 38, and the space between the radially inner face of the small-diameter tubular portion 30 and the outer peripheral face of the partition 38 is fluid-tightly sealed by the second seal rubber layer 34.

By disposing the partition 38 between the main rubber elastic body 16 and the flexible membrane 22, the fluid chamber 36 is divided into upper and lower parts sandwiching the partition 38. That is, on the upper side of the partition 38, there is formed a pressure-receiving chamber 70 whose wall is partially constituted by the main rubber elastic body 16 to induce internal pressure fluctuation upon a vibration input. On the other hand, on the lower side of the partition 38, there is formed an equilibrium chamber 72 whose wall is partially constituted by the flexible membrane 22 to easily allow volume change. The non-compressible fluid sealed in the fluid chamber 36 is filled in the pressure-receiving chamber 70 and the equilibrium chamber 72.

Further, the pressure-receiving chamber 70 and the equilibrium chamber 72 are connected with each other by an orifice passage 74 formed in the partition 38. In the orifice passage 74, the outer peripheral opening of the peripheral groove 44 formed in the partition main body 40 is fluid-tightly covered by the fitting tube member 24 via the second seal rubber layer 34. Thus, the orifice passage 74 extends with a length shorter than two circumferences in the circumferential direction. One end of the orifice passage 74 communicates with the pressure-receiving chamber 70 through an upper communication hole 75, while the other end thereof communicates with the equilibrium chamber 72 through a lower communication hole 76. In the present practical embodiment, as shown in FIG. 2, the upper communication hole 75 and the lower communication hole 76 are formed in the circumferentially intermediate portion of the peripheral groove 44. The peripheral groove 44 extends outward beyond the upper communication hole 75 and the lower communication hole 76 in the direction of the passage length of the orifice passage 74, so that the weight of the partition 38 is reduced.

The tuning frequency of the orifice passage 74, which is the resonance frequency of the fluid flowing through it is set as appropriate by adjusting the ratio of the passage sectional area and the passage length, considering the wall spring rigidity of the fluid chamber 36. In this practical embodiment, the tuning frequency is set to a low frequency of about 5 to 20 Hz corresponding to engine shake.

Furthermore, a short-circuit passage 77 is formed in the diametrically center portion of the partition 38 so as to connect the pressure-receiving chamber 70 and the equilibrium chamber 72 with each other. The short-circuit passage 77 is constituted by the upper short-circuit holes 56, 56, the housing space 60, and the lower short-circuit holes 50, 50. In the stationary state of the engine mount 10, the upper opening of the lower short-circuit hole 50 is covered by the valve body 64 disposed in the housing space 60, thereby obstructing the short-circuit passage 77. The valve body 64 is urged downward by the coil spring 66, and the seal lip 68 of the valve body 64 is pressed against the bottom wall inner face of the housing space 60, at the outer peripheral side of the lower short-circuit holes 50 constituting the short-circuit passage 77. As a result, the short-circuit passage 77 is substantially obstructed by the valve body 64.

Figure 7:
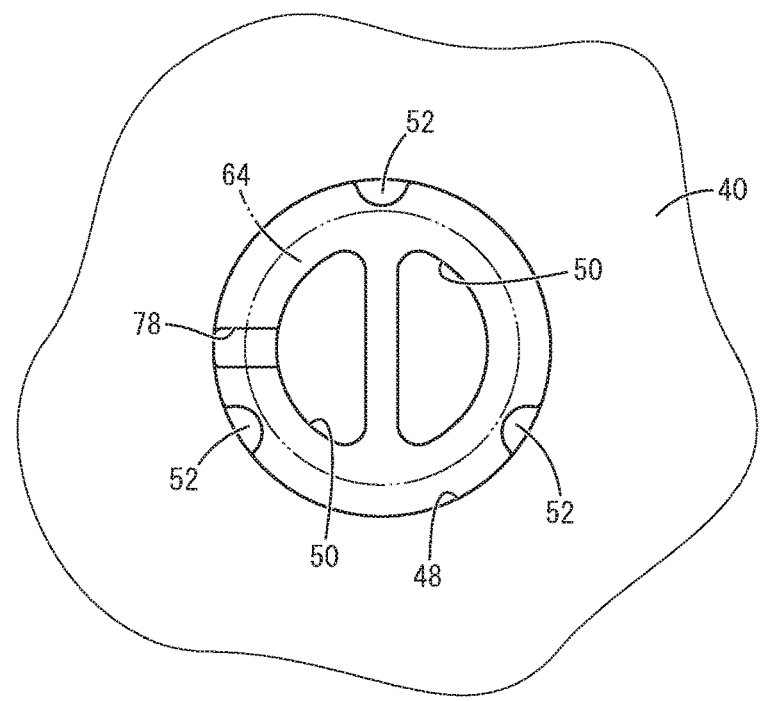
FIG. 7 is an enlarged view of a principal part of the partition main body shown in FIG. 6.
Figure 8:
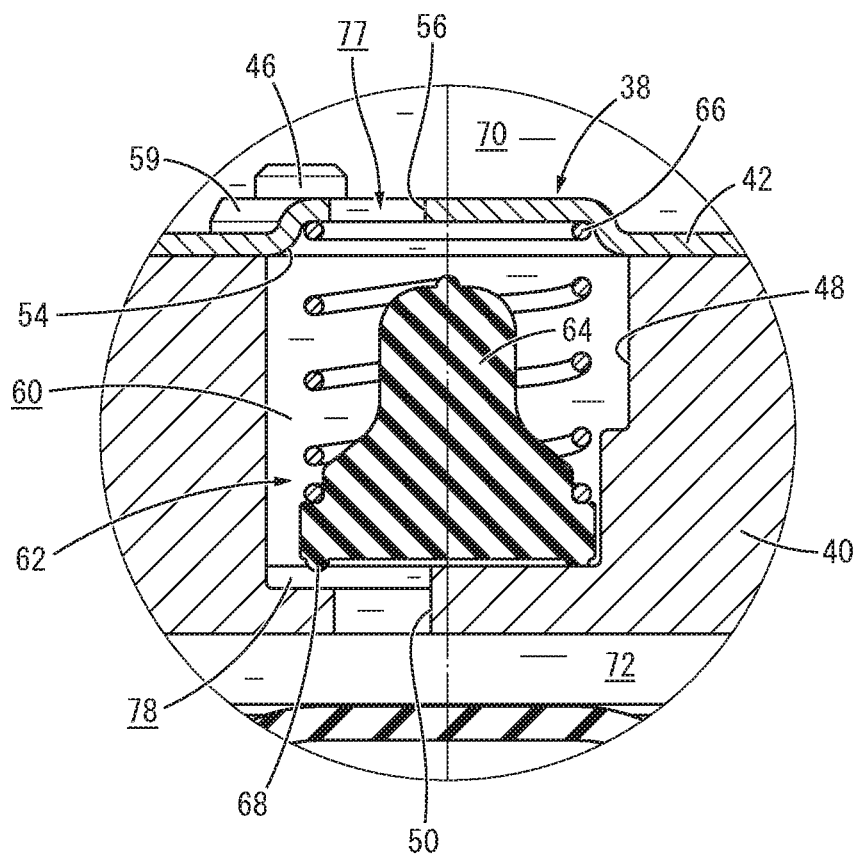
FIG. 8 is an enlarged cross-sectional view of a principal part, showing Part A of FIG. 1.

Here, a leak passage 78 is provided in a part of the partition main body 40 where the short-circuit passage 77 is formed. As shown in FIGS. 6 to 8, the leak passage 78 is constituted by a concave groove which opens to the bottom wall inner face of the housing space 60 against which the valve body 64 is pressed and extends radially. The radially inner end of the leak passage 78 communicates with one of the lower short-circuit holes 50 and the outer peripheral end thereof is located on the outer peripheral side of the seal lip 68 of the valve body 64. In the present practical embodiment, the outer peripheral end of the leak passage 78 is positioned on the outer peripheral side of the valve body 64 to extend to the outer peripheral end of the housing space 60. Furthermore, the leak passage 78 is provided in a part separate from the plurality of holding protrusions 52 in the peripheral direction, and the outer peripheral end of the leak passage 78 is disposed on the radial outside of the radially inner tip end of the holding protrusion 52. Thus, the outer peripheral end of the leak passage 78 is disposed radially outside the valve body 64. As a result, the leak passage 78 is provided in a state of being always opened without being obstructed by the valve body 64. In FIG. 7, the valve body 64 is indicated by the chain double-dashed line.

This leak passage 78 has a passage cross sectional area smaller than the passage cross sectional area of the orifice passage 74, preferably not larger than half as large as it, more preferably not larger than one-tenth as large as it. Furthermore, the ratio between the passage cross sectional area and the passage length of the leak passage 78 is larger than that of the orifice passage 74. Consequently, the resonance frequency of the fluid flowing through the leak passage 78 (the tuning frequency of the leak passage 78) is set to be a higher frequency than the resonance frequency of the fluid flowing through the orifice passage 74 (the tuning frequency of the orifice passage 74). Specifically, for example, the tuning frequency of the leak passage 78 can be tuned to a frequency range of about 20 to 40 Hz corresponding to idling vibration, a frequency range of 50 Hz or more corresponding to driving rumble, or the like.

The leak passage 78 communicates with the pressure-receiving chamber 70 through the housing space 60 and the upper short-circuit holes 56, 56 and also communicates with the equilibrium chamber 72 through the lower short-circuit holes 50, 50. Also in the obstruction state where the short-circuit passage 77 is not opened, the communication state between the pressure-receiving chamber 70 and the equilibrium chamber 72 is kept by the leak passage 78.

In the engine mount 10 having such a structure according to the present practical embodiment, the first attachment member 12 is attached to a not-shown power unit, while the second attachment member 14 and the fitting tube member 24 are attached to a vehicle body, which is not shown, either. Thus, the engine mount 10 is attached to the vehicle. The first attachment member 12 may be attached to the power unit via a not-shown inner bracket. Additionally, the second attachment member 14 and the fitting tube member 24 may be attached to the vehicle body via a not-shown outer bracket.

In this state where the engine mount 10 is mounted on the vehicle, input of a low-frequency, large-amplitude vibration corresponding to engine shake in the up-down direction between the first attachment member 12 and the second attachment member 14 induces internal pressure fluctuation in the pressure-receiving chamber 70. Then, the fluid flows between the pressure-receiving chamber 70 and the equilibrium chamber 72 through the orifice passage 74 in a resonant state in a positive manner. Consequently, the vibration is attenuated based on the flow action of the fluid, this exhibiting the target vibration-damping effect.

Upon input of the vibration with the frequency to which the orifice passage 74 is tuned, the fluid flow through the orifice passage 74, which has a sufficiently large passage cross sectional area than that of the leak passage 78, is more efficiently generated than the fluid flow through the leak passage 78. This makes it possible to advantageously obtain the target vibration-damping effect. In particular, since the leak passage 78 is always opened, compared to a structure in which the leak passage 78 is opened and closed by a valve or the like, the vibration-damping effect owing to the orifice passage 74 does not change depending on the degree of opening and closing of the valve and it is stably exhibited.

When a large negative pressure is generated in the pressure-receiving chamber 70 by input of an impact load, the valve body 64 is displaced upward against the elasticity of the coil spring 66 by the action of the negative pressure, in the relief mechanism 62. Hence, the seal lip 68 of the valve body 64 is separated from the bottom wall inner face of the housing space 60, thus cancelling obstruction of the lower short-circuit holes 50 by the valve body 64. By so doing, the short-circuit passage 77 is switched to the communication state, and the pressure-receiving chamber 70 and the equilibrium chamber 72 are thus connected with each other, by the short-circuit passage 77 with a shorter passage length than that of the orifice passage 74. As a result, the fluid moves through the short-circuit passage 77 from the equilibrium chamber 72 to the pressure-receiving chamber 70, whereby the negative pressure in the pressure-receiving chamber 70 is reduced or eliminated as soon as possible, thereby preventing noise and the like resulting from cavitation.

In addition, upon input of a vibration with a frequency higher than the tuning frequency of the orifice passage 74, the fluid flows through the leak passage 78, thus exerting the vibration-damping effect. That is, upon input of the vibration having the frequency higher than the tuning frequency of the orifice passage 74 such as idling vibration and driving rumble, the orifice passage 74 is substantially blocked by antiresonance. Here, since the communication state of the pressure-receiving chamber 70 and the equilibrium chamber 72 is maintained by the leak passage 78 in the state where the orifice passage 74 is substantially blocked. This prevents higher dynamic spring due to sealing of the pressure-receiving chamber 70, whereby the vibration-damping effect (the vibration isolation effect) by low dynamic spring is exerted.

In the present practical embodiment, the relief mechanism 62 includes the valve body 64 and the coil spring 66 in structure. That is, in the relief mechanism 62 of this practical embodiment, the valve body 64 is urged by the coil spring 66 and pressed against the partition main body 40 at the opening peripheral edge portion of the short-circuit passage 77, whereby the short-circuit passage 77 is blocked by the valve body 64. On the other hand, by the action of the negative pressure generated in the pressure-receiving chamber 70, the valve body 64 moves to the side of the pressure-receiving chamber 70 against the urging force of the coil spring 66. Consequently, the short-circuit passage 77 is switched to the communication state. Since the groove-shaped leak passage 78 is provided in the face in the partition main body 40 on which the valve body 64 is superposed, the communication state between the pressure-receiving chamber 70 and the equilibrium chamber 72 is maintained. Owing to this, the engine mount 10 having the relief mechanism 62 and the leak passage 78 can be realized compactly with a simple structure.

The valve body 64 is positioned in the axis-perpendicular direction relative to the partition 38 by the outer peripheral face of the valve body 64 abutting against the holding protrusions 52 protruding on the inner face of the peripheral wall of the housing space 60. This limits the amount of relative displacement in the axis-perpendicular direction of the valve body 64 in the housing space 60, so that the end portion on the outer peripheral side of the leak passage 78 is always opened, without being covered by the valve body 64. As a result, the communication state between the pressure-receiving chamber 70 and the equilibrium chamber 72 is stably maintained by the leak passage 78.

Since the passage cross sectional area of the leak passage 78 is not larger than half as large as the orifice passage 74, preferably not larger than one-tenth as large as the orifice passage 74. Consequently, upon the vibration input with the frequency to which the orifice passage 74 is tuned, the amount of the fluid flowing between the pressure-receiving chamber 70 and the equilibrium chamber 72 through the leak passage 78 is small. As a result, internal pressure fluctuation in the pressure-receiving chamber 70 is less likely to be moderated by the movement of the fluid through the leak passage 78. Then, the fluid flow through the orifice passage 74 is dominantly generated, so that the vibration-damping effect by the orifice passage 74 is effectively exhibited.

Furthermore, the resonance frequency of the fluid flowing through the leak passage 78 (the tuning frequency of the leak passage 78) is set to be higher than the resonance frequency of the fluid flowing through the orifice passage 74 (the tuning frequency of the orifice passage 74). Owing to this, the communication state between the pressure-receiving chamber 70 and the equilibrium chamber 72 is maintained by the leak passage 78, even for a vibration input with a frequency at which the orifice passage 74 is substantially obstructed by antiresonance. This makes it possible to effectively obtain the vibration-damping effect owing to lower dynamic spring in relation to a vibration input with a frequency higher than the tuning frequency of the orifice passage 74.

Figure 9:
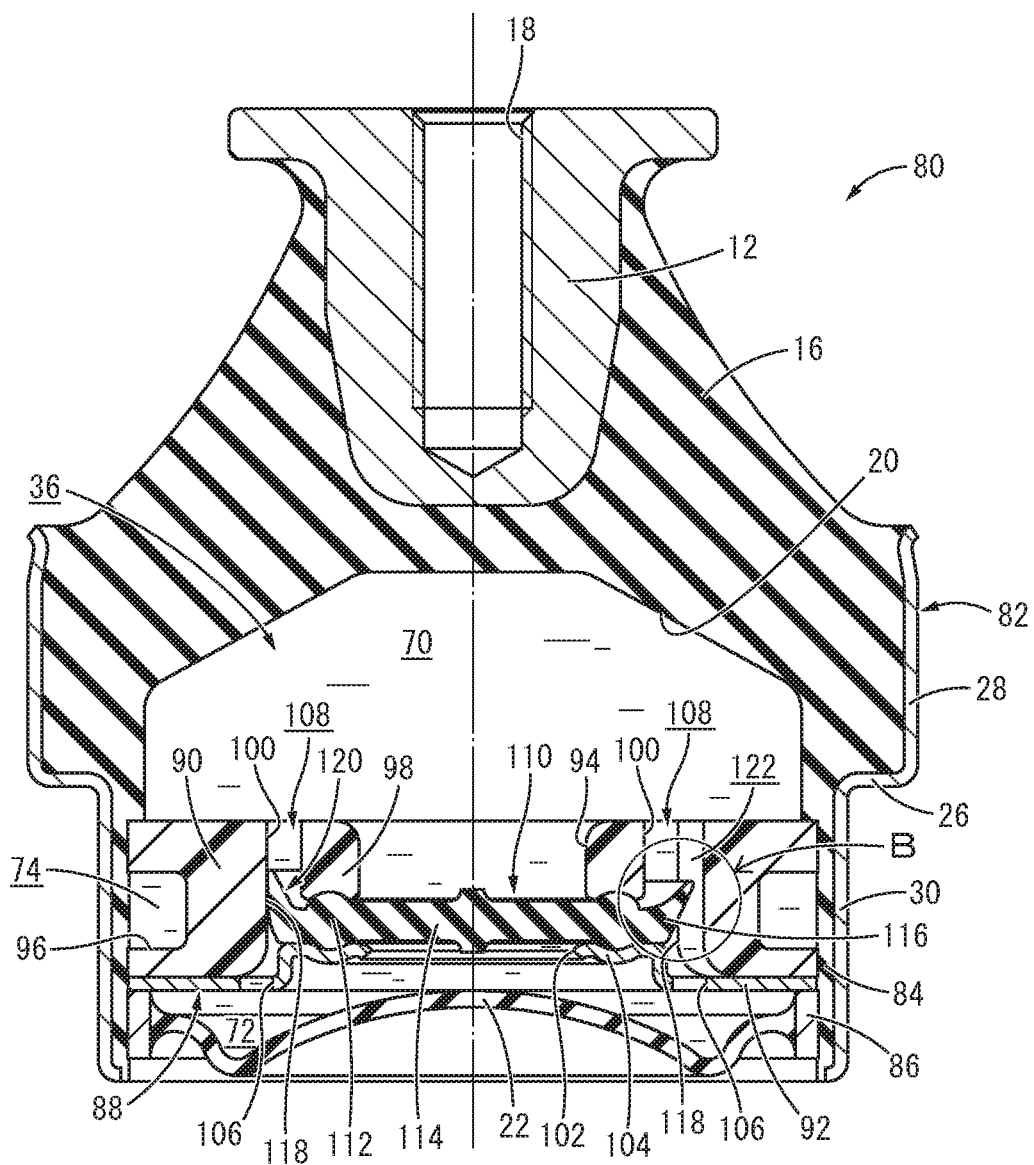
FIG. 9 is a cross-sectional view showing an engine mount as a second practical embodiment of the present invention.

FIG. 9 shows an automotive engine mount 80 as a second practical embodiment of a fluid-filled vibration-damping device having a structure according to the present invention. In the following description, substantially the same members and parts as those of the first practical embodiment are denoted by the same reference numerals in the drawings, and the description thereof will be omitted.

That is, the engine mount 80 has a structure in which the first attachment member 12 and a second attachment member 82 are elastically connected with each other by the main rubber elastic body 16. The second attachment member 82 has a stepped cylindrical shape similar to the fitting tube member 24 of the first practical embodiment. The main rubber elastic body 16 is bonded by vulcanization to the radially inner face of the large-diameter tubular portion 28, while a seal rubber layer 84 integrally formed with the main rubber elastic body 16 is bonded by vulcanization to the radially inner face of the small-diameter tubular portion 30.

The flexible membrane 22 is attached to the lower end portion of the small-diameter tubular portion 30 of the second attachment member 82. An annular fixing member 86 is fixed to the outer peripheral end portion of the flexible membrane 22 across the entire circumference. With the fixing member 86 inserted in the lower end portion of the second attachment member 82, the second attachment member 82 is subjected to a diameter reduction process, so that the flexible membrane 22 is attached to the second attachment member 82.

A partition 88 is disposed in the fluid chamber 36 defined by the main rubber elastic body 16 and the flexible membrane 22. The partition 88 has a substantially disk shape as a whole, and it has a structure in which a partition main body 90 and a bottom plate member 92 are overlapped vertically.

The partition main body 90 is a rigid member made of metal, synthetic resin, or the like, and it has an upper through hole 94 penetrating vertically a diametrically central portion, and has a substantially annular plate shape as a whole. The partition main body 90 has a thick radially outer portion and a peripheral groove 96 extending circumferentially with a length less than one circumference. The radially inner portion of the partition main body 90 is thinner in the up-down direction than the radially outer portion thereof, and the radially inner end portion is provided with an annular upper clamping part 98 projecting downward. In the thin radially inner portion of the partition main body 90, upper short-circuit holes 100 vertically penetrating the outer peripheral side of the upper clamping part 98 are formed at a plurality of positions in the circumferential direction.

The bottom plate member 92 is a thin-walled substantially annular plate-shaped member formed of a press fitting, for example, and has a lower through hole 102 penetrating vertically a diametrically central portion. Furthermore, for the bottom plate member 92 of the present practical embodiment, the radial inside of a step formed at the radially middle part is a lower clamping part 104 positioned higher than the radial outside of the step. Additionally, a lower short-circuit hole 106 is formed through the radial outside of the step in the up-down direction.

The outer peripheral portion of the bottom plate member 92 is overlapped with the outer peripheral portion of the partition main body 90 from the lower side. The upper short-circuit holes 100 of the partition main body 90 and the lower short-circuit hole 106 of the bottom plate member 92 are vertically connected. The upper short-circuit holes 100 and the lower short-circuit hole 106 constitute a short-circuit passage 108 vertically penetrating the partition 88.

A movable member 110 is disposed between the partition main body 90 and the bottom plate member 92 which are vertically superposed on each other. The movable member 110 is formed of a rubber elastic body and has a substantially disk shape. An annular clamped part 112 is provided at a radially middle portion, and the radial inside of the clamped part 112 is a movable membrane part 114 in a disk shape, and the radial outside of the clamped part 112 is a valve body part 116 serving as a valve body. The valve body part 116 projects to the outer peripheral side while inclining upward, and it has a cross sectional shape that becomes gradually thinner as it goes toward the projecting tip thereof.

The movable member 110 is disposed between the partition main body 90 and the bottom plate member 92 in the up-down direction, and the clamped part 112 is clamped between the upper clamping part 98 of the partition main body 90 and the lower clamping part 104 of the bottom plate member 92. In the disposition state of the movable member 110, the movable membrane part 114, which is the radially inner portion, is provided so as to obstruct the openings of the upper through hole 94 of the partition main body 90 and the lower through hole 102 of the bottom plate member 92. The upper through hole 94 and the lower through hole 102 are separated from each other by the movable membrane part 114. Additionally, the valve body part 116 provided at the outer peripheral end portion is pressed against a passage inner face 118 on the outer peripheral side of the short-circuit passage 108, so that the short-circuit passage 108 is substantially obstructed by the valve body part 116.

The partition 88 having such a structure is inserted into the small-diameter tubular portion 30 of the second attachment member 82, and the second attachment member 82 is subjected to a diameter reduction process. Thus, the partition 88 is disposed in the fluid chamber 36 on the radial inside of the small-diameter tubular portion 30 of the second attachment member 82. Therefore, the fluid chamber 36 is divided into two, i.e., into the pressure-receiving chamber 70 above the partition 88 and the equilibrium chamber 72 below the partition 88.

A relief mechanism 120 of the present practical embodiment has a structure including the valve body part 116 of the movable member 110. That is, the short-circuit passage 108 connecting the pressure-receiving chamber 70 and the equilibrium chamber 72 is obstructed by the valve body part 116 being disposed to be pressed against the passage inner face 118 of the short-circuit passage 108. On the other hand, by the action of the negative pressure generated in the pressure-receiving chamber 70, the valve body part 116 undergoes elastic deformation and is separated from the passage inner face 118 of the short-circuit passage 108. Hence, the short-circuit passage 108 is switched from the obstruction state to the communication state. When a negative pressure enough to cause cavitation acts on the pressure-receiving chamber 70, the relief mechanism 120 brings the short-circuit passage 108 into the communication state, so that the pressure-receiving chamber 70 and the equilibrium chamber 72 communicate with each other through the short-circuit passage 108. This reduces the negative pressure in the pressure-receiving chamber 70 as rapidly as possible.

Figure 10:
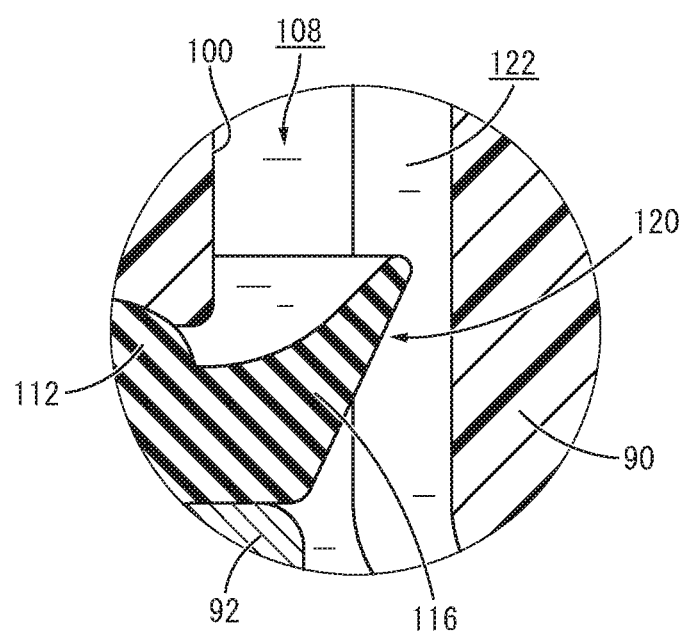
FIG. 10 is an enlarged cross-sectional view of a principal part, showing Part B of FIG. 9.

Here, as shown in FIGS. 9 and 10, a leak passage 122 is formed in the passage inner face 118 on the outer peripheral side of the short-circuit passage 108. The leak passage 122 has a shape of a groove which extends in the up-down direction, which is the direction of the passage length of the short-circuit passage 108, while opening in the passage inner face 118 of the short-circuit passage 108. The leak passage 122 extends outward beyond the part of the passage inner face 118 of the short-circuit passage 108 where the valve body part 116 is abutted, in the up-down direction, and extends over the entire up-down length of the partition main body 90 in the present practical embodiment. As a result, the leak passage 122 is not covered by the valve body part 116, and the pressure-receiving chamber 70 and the equilibrium chamber 72 are maintained in the communication state through the leak passage 122.

The passage cross sectional area of the leak passage 122 is smaller than that of the orifice passage 74, similarly to the leak passage 78 of the first practical embodiment. Preferably, the cross sectional area of the leak passage 122 is not larger than half as large as that of the orifice passage 74, and more preferably not larger than one-tenth as large as that of the orifice passage 74. In addition, the tuning frequency of the leak passage 122 is set to be higher than the tuning frequency of the orifice passage 74. The orifice passage 74 of the present practical embodiment is formed by the peripheral groove 96 extending with a length less than one circumference, but it is tuned to a low frequency vibration corresponding to engine shake, by adjusting the passage cross sectional area.

Owing to provision of this leak passage 122, upon input of a vibration with a frequency higher than the tuning frequency of the orifice passage 74, even if the orifice passage 74 is substantially blocked by antiresonance, the pressure-receiving chamber 70 and the equilibrium chamber 72 are maintained in a state of communicating with each other through the leak passage 122. As a result, in the state where the orifice passage 74 is substantially blocked, lower dynamic spring is achieved and the target vibration-damping effect can be obtained. Furthermore, since the leak passage 122 is provided in the part of the relief mechanism 120 where the short-circuit passage 108 is formed, the engine mount 80 having both the relief mechanism 120 and the leak passage 122 can be realized compactly with a simple structure.

In the present practical embodiment, the vibration-damping effect owing to lower dynamic spring is exerted by the deformation of the movable membrane part 114 of the movable member 110, in relation to the vibration input with a frequency higher than the tuning frequency of the orifice passage 74. The action of transmitting the liquid pressure between the pressure-receiving chamber 70 and the equilibrium chamber 72 by the deformation of the movable membrane part 114 is restricted when the low-frequency, large-amplitude vibration to which the orifice passage 74 is tuned is input. This efficiently induces a fluid flow through the orifice passage 74. In addition, for example, the movable membrane part 114 is configured to be actively deformed in a resonant state, in relation to a vibration input with a frequency higher than the tuning frequency of the orifice passage 74 and lower than the tuning frequency of the leak passage 122 to efficiently exhibit the action of transmitting the liquid pressure. Specifically, for example, the resonance frequency of the movable membrane part 114 is set to be a frequency corresponding to idling vibration, while the tuning frequency of the leak passage 122 is set to be a higher frequency such as driving rumble, etc.

Figure 11:
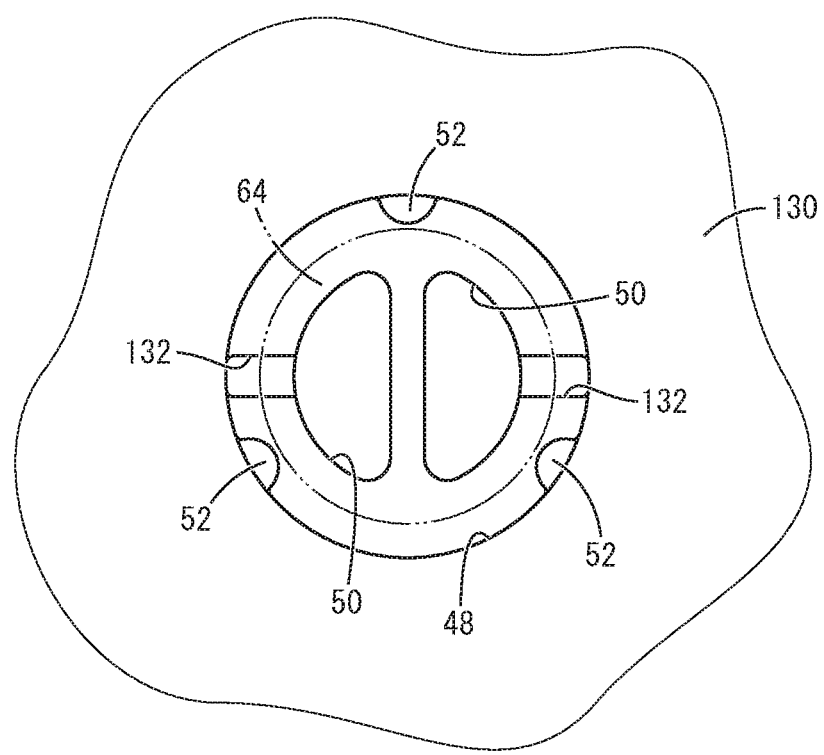
FIG. 11 is a plan view showing a principal part of a partition main body constituting a fluid-filled vibration-damping device as a third practical embodiment of the present invention.

FIG. 11 shows a principal part of a partition main body 130 constituting a fluid-filled vibration-damping device as a third practical embodiment of the present invention. In the housing recess 48 of the partition main body 130, two leak passages 132, 132 are provided opening to the bottom face thereof. In short, a plurality of leak passages 132 extend in a spoke-wise fashion radially outward from the lower short-circuit holes 50, 50. In the present practical embodiment, the two leak passages 132, 132 extend from the respective two lower short-circuit holes 50, 50, radially outward in opposite directions.

By forming the plurality of leak passages 132 in this way, it is possible to adjust the total passage cross sectional area of the plurality of leak passages 132, without increasing the passage cross sectional area of each leak passage 132. Therefore, it is possible to easily tune the characteristics of the vibration-damping performance exerted by the plurality of leak passages 132.

Figure 12:
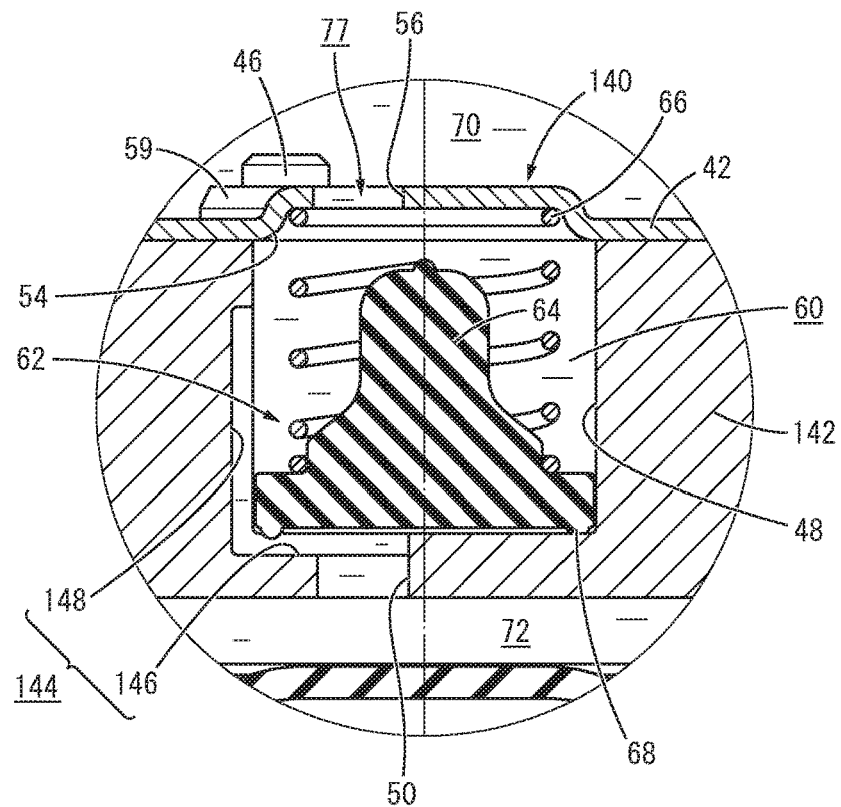
FIG. 12 is a cross-sectional view showing a principal part of a fluid-filled vibration-damping device as a fourth practical embodiment of the present invention.
Figure 13:
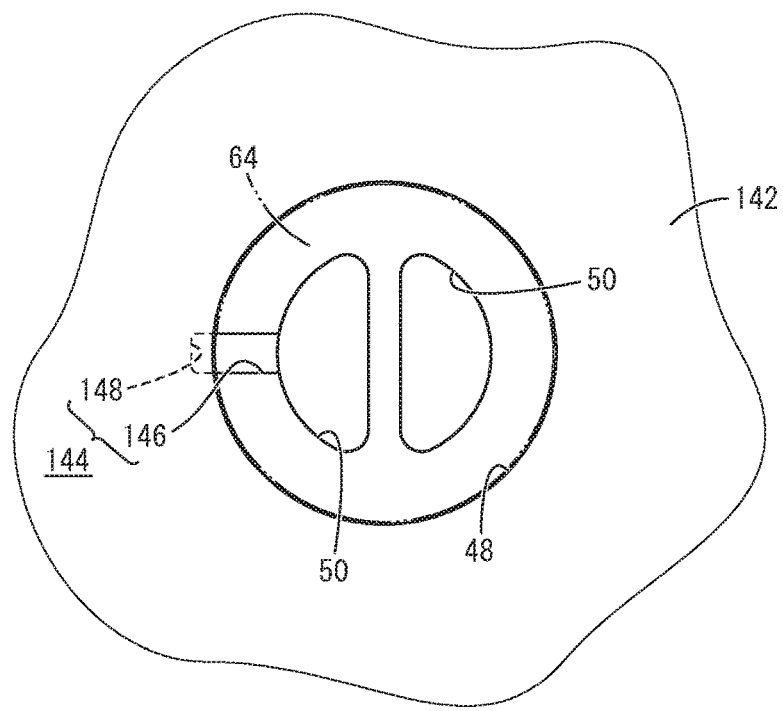
FIG. 13 is a plan view showing a principal part of a partition main body constituting the fluid-filled vibration-damping device shown in FIG. 12.

FIG. 12 shows a principal part of a fluid-filled vibration-damping device as a fourth practical embodiment of the present invention. A leak passage 144 is provided in a partition main body 142 of a partition 140 constituting the fluid-filled vibration-damping device, at a part of the relief mechanism 62 where the short-circuit passage 77 is provided. As shown in FIGS. 12 and 13, in the structure of the leak passage 144, a lateral groove 146 extending in the radial direction from the opening peripheral edge portion of the lower short-circuit hole 50 to the outer peripheral side and a vertical groove 148 formed in the inner face of the peripheral wall of the housing recess 48 to extend vertically are provided continuously in series.

In the present practical embodiment, the holding protrusion like that of the first practical embodiment is not formed on the inner face of the peripheral wall of the housing recess 48, and the lower part of the valve body 64 disposed in the housing recess 48 is formed with an outer diameter slightly smaller than the inner diameter of the housing recess 48. By so doing, movement of the valve body 64 in the axis-perpendicular direction is restricted by contact between the outer peripheral face of the valve body 64 and the inner face of the peripheral wall of the housing recess 48. When the valve body 64 moves in the axis-perpendicular direction within the housing recess 48, the entire lateral groove 146 of the leak passage 144 can be covered by the valve body 64. In FIG. 13, the valve body 64 is indicated by the chain double-dashed line.

Here, as shown in FIG. 12, the vertical groove 148 of the leak passage 144 has a vertical length larger than the vertical dimension of the lower portion of the valve body 64 having a large diameter. Even if the valve body 64 moves in the up-down direction against the urging force of the coil spring 66, the upper end of the vertical groove 148 of the leak passage 144 is maintained in the open state. Therefore, the pressure-receiving chamber 70 and the equilibrium chamber 72 are maintained in the communication state by the leak passage 144, irrespective of the position of the valve body 64.

According to the present practical embodiment like this, even in a structure without the holding protrusion where the entire lateral groove 146 of the leak passage 144 can be covered by the valve body 64, since the leak passage 144 has the vertical groove 148 continuous with the lateral groove 146, the pressure-receiving chamber 70 and the equilibrium chamber 72 are kept in communication by the leak passage 144. In this way, as long as the pressure-receiving chamber 70 and the equilibrium chamber 72 are maintained in the communication state by the leak passage 144, the holding protrusion is not indispensable.

Although the practical embodiments of the present invention have been described in detail above, the present invention is not limited by the specific description of the practical embodiments. For example, the tuning frequencies of the orifice passage 74 and the leak passage 78 are merely examples, and can be changed as appropriate according to the required vibration-damping characteristics and the like.

Figure 14:
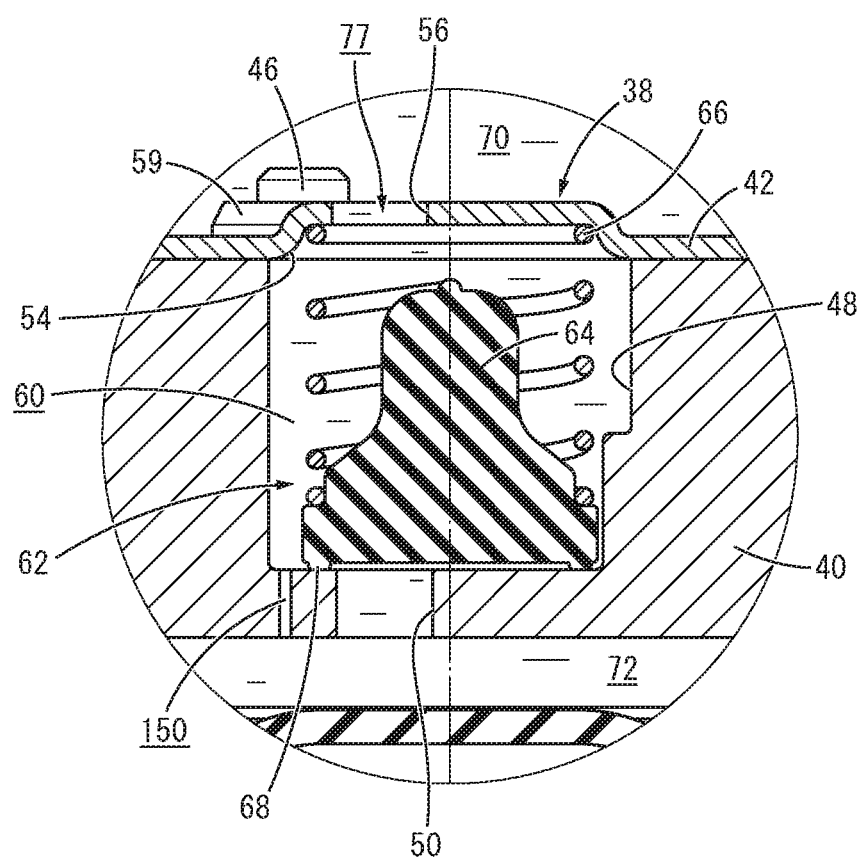
FIG. 14 is a cross-sectional view showing a principal part of a fluid-filled vibration-damping device as another practical embodiment of the present invention.

The number of formation of the leak passage 78, the arrangement of the leak passage 78, and the like are not particularly limited. Specifically, for example, as shown in FIG. 14, a leak passage 150 having a hole shape vertically penetrating the lower wall portion of the housing recess 48 of the partition main body 40 may be formed at a position separated from the lower short-circuit holes 50, 50 to the outer peripheral side, in the formation part of the short-circuit passage 77.

In the first practical embodiment, there is shown, as an example, the structure in which the valve body 64 is disposed in the middle of the short-circuit passage 77 in the passage length direction. However, the valve body 64 may be disposed, for example, on the extension of the short-circuit passage 77 so that the end opening of the short-circuit passage 77 can be opened and closed by the valve body 64. In sum, the term "on the short-circuit passage 77 where the valve body 64 is disposed" includes not only the middle of the short-circuit passage 77 in the passage length direction but also the extension of the short-circuit passage 77.

In the above-described practical embodiment, there is shown a so-called bowl-shaped fluid-filled vibration-damping device, as an example. However, the present invention may be applied to a tubular fluid-filled vibration-damping device with a structure wherein the inner shaft member and the outer tubular member disposed externally about it are elastically connected to each other by the main rubber elastic body.

The application range of the present invention is not limited to the engine mount, but it can be applied to various fluid-filled vibration-damping devices such as a sub-frame mount, a differential mount, a body mount, and a suspension bushing. Further, the present invention is not only applied to fluid-filled vibration-damping devices for automobiles, but also preferably applicable to fluid-filled vibration-damping devices used for motorized two wheeled vehicles, railway vehicles, industrial vehicles, etc.

What is claimed is:

1. A fluid-filled vibration-damping device comprising:
   a pressure-receiving chamber with a non-compressible fluid filled therein;
   an equilibrium chamber with the non-compressible fluid filled therein;
   an orifice passage connecting the pressure-receiving chamber and the equilibrium chamber with each other;
   a relief configured to open a short-circuit passage by an action of a negative pressure occurring in the pressure-receiving chamber upon input of an impact load so as to connect the pressure-receiving chamber with the equilibrium chamber so that cavitation is suppressed;
   at least one leak passage provided at a part of the short-circuit passage in the relief, the at least one leak passage keeping a communication state between the pressure-receiving chamber and the equilibrium chamber with a smaller passage cross section than that of the orifice passage, even when the short-circuit passage is not opened;
   a partition disposed dividing the pressure-receiving chamber and the equilibrium chamber so that the short-circuit passage is formed in the partition;
   a valve body obstructing the short-circuit passage by elastic pressing abutment thereof against the partition, in which the relief is provided such that the pressing abutment of the valve body against the partition is cancelled by the action of the negative pressure occurring in the pressure-receiving chamber upon the input of the impact load so that the short-circuit passage is opened to connect the pressure-receiving chamber with the equilibrium chamber and the cavitation is suppressed, and the leak passage is formed in a groove shape opening in a face in the partition against which the valve body is pressed;
   an urger urging the valve body disposed on the short-circuit passage, from a side of the pressure-receiving chamber to a side of the equilibrium chamber, and elastically pressing the valve body against the partition so that the short-circuit passage is obstructed by the valve body, in which the leak passage is formed in the groove shape extending radially outward from an opening of the short-circuit passage beyond the valve body, in the face in the partition against which the valve body is pressed,
   wherein the partition includes a housing recess and an upper opening of the housing recess is covered by a lid plate member so that a housing space is formed in the partition and the housing space houses the relief including the valve body and the urger, and the urger is compressed vertically and disposed between the lid plate member and the valve body; and
   a holding protrusion formed in an inner face of the housing space, the holding protrusion protruding inward, wherein:
      an outer face of the valve body and a protruding distal end of the holding protrusion are abutted so that the valve body is positioned within the housing space, and
      the leak passage is formed in a part separate from the holding protrusion in a peripheral direction, in the inner face of the housing space.

2. The fluid-filled vibration-damping device according to claim 1, wherein
   the at least one leak passage comprises a plurality of leak passages formed in a spoke-wise fashion radially outward from the opening of the short-circuit passage.

3. The fluid-filled vibration-damping device according to claim 1, wherein
   the valve body formed of an elastic body is pressed against a passage inner face of the short-circuit passage so that the short-circuit passage is obstructed by the valve body, and
   the leak passage is formed in the groove shape extending outward beyond a part against which the valve body is pressed, in a length direction of the short-circuit passage, in the passage inner face of the short-circuit passage.

4. The fluid-filled vibration-damping device according to claim 1, wherein
   a passage cross sectional area of the leak passage is not larger than half as large as a passage cross sectional area of the orifice passage, and
   a resonance frequency of the fluid flowing through the leak passage is set to be a higher frequency than a resonance frequency of the fluid flowing through the orifice passage.

5. The fluid-filled vibration-damping device according to claim 1, wherein
   the urger is a coil spring.

6. The fluid-filled vibration-damping device according to claim 1, wherein
   the urger and the valve body are separate pieces of structure.

* * * * *